United States Patent [19]

Suzuki et al.

[11] Patent Number: 5,106,788
[45] Date of Patent: Apr. 21, 1992

[54] PROCESS FOR PRODUCING HIGHLY TOUGH CERAMICS

[75] Inventors: Junichiro Suzuki, Gifu; Shoji Sakakibara, Kasugai, both of Japan

[73] Assignee: NGK Spark Plug Co., Ltd., Nagoya, Japan

[21] Appl. No.: 742,737

[22] Filed: Aug. 6, 1991

Related U.S. Application Data

[60] Continuation of Ser. No. 565,899, Aug. 10, 1990, abandoned, which is a continuation of Ser. No. 178,606, Apr. 7, 1988, abandoned, which is a division of Ser. No. 763,349, Aug. 7, 1985, abandoned, said Ser. No. 565,899, is a continuation of Ser. No. 500,240, Mar. 27, 1990.

[30] Foreign Application Priority Data

Aug. 22, 1984 [JP] Japan ................................ 59-176927
Aug. 22, 1984 [JP] Japan ................................ 59-176928

[51] Int. Cl.$^5$ .......................... C04B 35/10; C04B 35/56
[52] U.S. Cl. ................................................ 501/87; 51/309
[58] Field of Search .............................. 501/87; 51/309

[56] References Cited

U.S. PATENT DOCUMENTS

| | | | |
|---|---|---|---|
| 3,580,708 | 5/1971 | Ogawa et al. | 51/307 |
| 3,886,254 | 5/1975 | Tanaka et al. | 501/87 |
| 4,356,272 | 10/1982 | Kanemitsu et al. | 501/87 |
| 4,407,968 | 10/1983 | Lee et al. | 501/87 |

FOREIGN PATENT DOCUMENTS 59-102865 6/1984 Japan .

*Primary Examiner*—Mark L. Bell
*Attorney, Agent, or Firm*—Fish & Richardson

[57] ABSTRACT

Highly tough ceramics are produced by:
 providing a formulation comprised of 20 to 50% by weight of titanium carbide expressed in terms of the general formula TiCx wherein x is 0.65 to 0.93, 0.1 to 2% by weight of one or more sintering aids, and 48-79.9% by weight of $Al_2O_3$, and
 sintering said formulation by the press-sintering process.

Alternatively highly tough ceramics are produced by:
 providing a formulation comprised of 20 to 50% by weight of titanium carbide expressed in terms of the general formula TiCx wherein x is 0.65 to 0.93, 0.05 to 3.0% by weight of one or more rare earth oxides, and 47 tto 79.95% by weight of $Al_2O_3$;
 subjecting the formulation to primary sintering in an inert gas until relative theoretical density of 95-99% is achieved, and
 sintering the resultant mass by the hot isostatic pressing process.

16 Claims, No Drawings

PROCESS FOR PRODUCING HIGHLY TOUGH CERAMICS

This application is a continuation of U.S. application Ser. No. 07/565,899, filed Aug. 10, 1990, now abandoned, which is a continuation of U.S. Ser. No. 07/178,606, filed Apr. 7, 1988, now abandoned, which is a division of U.S. Ser. No. 06/763,349, filed Aug. 7, 1985, now abandoned. Ser. No. 07/565,899 is also a continuation of Ser. No. 07/500,240, filed Mar. 27, 1990.

FIELD OF THE INVENTION

The present invention relates to a process for producing ceramic materials of high density and large toughness and, more specifically, to a process for producing $Al_2O_3$-TiC base, highly tough ceramics which are useful as the materials for cutting tools.

BACKGROUND OF THE INVENTION

Of tool materials, cutting tools receiving severe force or heat at their edge portions in particular are required to have the following material properties:
1. To have a high hardness at high temperatures.
2. To have a toughness especially at high temperatures.
3. That they are chemically stable and do not react at their edges with work, i.e., material to be cut.

Alumina base tool materials now finding use as cutting tool materials meet entirely the required properties 1 and 3, but offer a problem in connection with the property 2. $Al_2O_3$-TiC base ceramics have been developed so as to overpass such a limit. The ceramics of such a system introduce epoch-making improvements in the $Al_2O_3$ base materials, and are a typical and successful example of composite ceramics. However, since they are a composite of oxides and carbides, difficulty is involved in the densification thereof by simply applying heat. It is then required to take a certain measure so as to prohibit the generation of gases between the $Al_2O_3$ particles and the associated dispersive particles (TiC) to an extreme extent. Typical of the industrial production techniques for stably making the products of high quality are hot pressing (hereinafter referred to as "HP") whrerein mechanial force is applied together with heat, and hot isostatic pressing (hereinafter reffered to as "HIP") wherein large and uniform forces are applied from the entire circumference of the body to be pressed. Such $Al_2O_3$-TiC base ceramics are characterized by good wear resistance and low affinity to iron, and so enjoy wide use in the precision finishing or high-speed cutting of cast iron.

Now, very high cutting speed is being demanded so as to achieve higher productivity in various fields such as automobile or aircraft industries. On the other hand, machine tools coping with such high cutting speed have been developed.

With the progress of unmanned production lines, it is required to enhance the reliability of tools, inter alia, ceramic tools.

In order to achieve high-speed cutting and improve the reliability of cutting tools, it is required to further improve the performance, especially, toughness of currently available $Al_2O_3$-TiC base ceramics.

As one means for improving toughness, consideration is given to the enhancement or reinforcement of the interfaces of the TiC particles per se and the $Al_2O_3$ particles per se, or those between the TiC particles and the $Al_2O_3$ particles. In the past, the addition of $TiO_2$ (JP Patent Kokoku-Publication No. 51-569) or Ti (JP Patent Kokoku-Publication Nos. 50-20968 and 50-39445) was attempted for that purpose.

SUMMARY OF THE DISCLOSURE

However, satisfactory results have not been obtained in the prior art hereinabove mentioned.

The present invention has it for its object to provide a solution to the aforesaid problems, particularly a process for preducing $Al_2O_3$-TiC base ceramics having a higher toughness.

According to a first aspect of the present invention, there is provided a process for producing highly tough ceramics characterized by:

providing a formulation consisting essentially of 20 to 50% by weight of titanium carbide expressed in terms of the general formula TiCx wherein x is 0.65 to 0.93, 0.1 to 2% by weight of one or more sintering aids, and 48–79.9% by weight of $Al_2O_3$, and sintering said formulation by the press-sintering process.

It is understood that the wording "press-sintering" refers to a process wherein the mass to be sintered is sintered while applying a mechanical pressure thereto. The pressure of the atmosphere applied may suitably be selected from reduced pressure, normal ambient pressure and elevated pressure. Typical of press-sintering is the hot-pressing.

According to a second aspect of the present invention, there is provided a process for producing highly tough ceramics characterized by:

providing a formulation consisting essentially of 20 to 50% by weight of titanium carbide expressed in terms of the general formula TiCx wherein x is 0.65 to 0.93, 0.05 to 3.0% by weight of one or more rare earth oxides, and 47 to 79.95% by weight of $Al_2O_3$, subjecting the formulation to primary sintering in an inert gas until a relative theoretical density of 95–99% is achieved, and sintering the resultant mass by the hot isostatic pressing process.

Compared to the second aspect, the first aspect requires less amount of the sintering aids and can more easily provide products having superior property at high temperatures. The second aspect has advantage in more freedom in providing the shape of the products and also in cost reduction of production.

In both the first and second aspects of the present invention, it is required that TiCx (wherein x=0.65–0.93) be used in an amount of 20 to 50% by weight (preferably 20 to 35% by weight).

The aforesaid TiCx is non-stoichiometrical titanium carbide wherein Ti is present in excess, and has a crystal structure that is more incomplete and unstable than the stoichiometrical titanium carbide expressed in terms of TiC. For that reason, the sintering reaction such as solid-phase reaction takes place so easily that the interface between the $Al_2O_3$ particles and the TiCx particles and that between the TiCx particles per se are enhanced, as compared with the interfaces between the $Al_2O_3$ particles and the TiC particles and that between the TiC particles per se. The interatomic bond of Ti and Cx takes on a sort of metallic bonding nature in addition to covalent bonding, thus making a contribution to improvements in toughness.

Where x in TiCx is less than 0.65, the performance, especially, wear resistance, of the sintered mass drops.

Where x is larger than 0.93, on the other hand, $TiC_x$ produces a less, or limited, non-stoichiometrical effect, thus resulting in insufficient toughness. Preferably, x ranges from 0.80 to 0.90.

As mentioned already, it is required that the aforesaid $TiC_x$ be used in an amount of 20 to 50% by weight. However, where the amount of $TiC_x$ is less than 20% by weight, the effect resulting from the use of $TiC_x$ becomes insufficient, whereas when it is larger than 50% by weight, sinterability deteriorates so that no sufficient toughness is obtained. Preferably, $TiC_x$ is used in an amount of 20-35% by weight.

$Al_2O_3$ suitable for use in the present invention is ones having the purity of 99.5% by weight or more and an average particle size of 2 μm or less (more preferably 1 μm or less).

FIRST ASPECT

In the first aspect of the present invnention, it is further required that one or more sintering aids such as, for instance, MgO, CaO, etc. be used in an amount of 0.1 to 2% by weight. The sintering aid is preferably used in an amount of 0.3-1.5% by weight.

The sintering aids form a compound with $Al_2O_3$, which, in turn, serves to promote the sintering of ceramics, thus giving rise to improvements in sinterability. In addition, the addition of the sintering aids makes it possible to restrict the grain growth of $Al_2O_3$ during sintering. The term "sintering aids" refers in this aspect to those usually for the sintering of ceramics composed mainly of $Al_2O_3$ such as those based on $Al_2O_3$, $Al_2O_3$—TiC, $Al_2O_3$—$ZrO_2$, etc., and is understood to embrace, for instance, MgO, CaO, $SiO_2$, $ZrO_2$, NiO, $Th_2O_3$, AlN, TiO, $TiO_2$, $Cr_2O_3$, or rare earth oxides such as $Y_2O_3$, $Dy_2O_3$, $Er_2O_3$, $Ho_2O_3$, $Gd_2O_3$, $Tb_4O_7$, etc.

As stated already, the amount of the sintering aids used according to the first aspect ranges from 0.1% by weight to 2% by weight. In an amount of less than 0.1% by weight, the aforesaid effect becomes insufficient. In an amount exceeding 2% by weight, on the contrary, a larger amount of the aforesaid compound lowers the high-temperature properties of the ceramic materials.

In the first aspect of the present invention, the press-sintering process, preferably the hot-pressing process, is used for sintering. Press-sintering is carried out at a temperature of 1600°-1900° C. (preferably 1700°-1850° C.) and a pressure of about 50 kPa or higher (preferably 100 kPa or higher) in a non-oxidizing atmosphere (preferably an inert gas atmosphere). A sintering period of time is usually 5-120 min., preferably 10-40 min. for the commercial products. The press-sintering may be effected with or without precompacting the formulation. While this precompacting may be done through cold pressing, the presintering through normal sintering may optionally be made prior to the press-sintering. Precompacting or press-sintering is carried out without or with compacting aids (organic or inorganic binder).

SECOND ASPECT

In the following, reference will be made to the second aspect of the present invention.

In the second aspect of the present invention, it is required that, in addition to $Al_2O_3$ and $TiC_x$, one or more rare earth oxides such as, for instance, $Y_2O_3$, $Dy_2O_3$, etc. be used in an amount of 0.05 to 3.0% by weight.

The rare earth oxides are used at a relatively low temperature of, e.g., 1750° C. in the primary sintering to bring the relative theoretical density of the formulation to at least 95% required as the preceding state for the HIP treatment to be described later.

When the amount of the rare earth oxides is less than 0.05% by weight, the relative theoretical density of the formulation does not reach 95%, unless the primary sintering is carried out at a relatively high temperature. In this case, the grain growth of $Al_2O_3$ takes place so that the strength of the sintered mass drops.

Where the amount of the rare earth oxides exceeds 3% by weight, on the contrary, although some sintered mass may be obtained, but it is decreased in toughness to such an extent that it is no longer used as any tool in view of the properties as contemplated in the present invention.

Among the rare earth oxides, any one or a mixture of $Dy_2O_3$, $Y_2O_3$, $Tb_4O_7$, $Ho_2O_3$, $Er_2O_3$ and $Gd_2O_3$ provides a marked effect upon giving a given relative theoretical density at a relatively low temperature in the aforesaid primary sintering.

Furthermore, the total formulation may be added with one or more sintering aids in an amount of no higher than 2% by weight, which may be those used for the sintering of ceramics composed mainly of $Al_2O_3$ such as those based on $Al_2O_3$, $Al_2O_3$—TiC, $Al_2O_3$—$ZrO_2$, etc. For instance, the sintering aids may be MgO, CaO, $SiO_2$, $ZrO_2$, NiO and the like (e.g., the sintering aids referred to in the first aspect except for rare earth oxides). This is preferred, since the effect upon the restriction of grain growth during sintering increases further, thus providing a ceramic material of higher strength. If used, the amount of the sintering aid would be 0.1% by weight or more for effectiveness and preferably 0.5-2.0% by weight. The total amount of rare earth oxides and the other sintering aids is preferably 1-3% by weight.

In the second aspect the aforesaid formulation is presintered through normal sintering or press-sintering. The press-sintering may be made with or without precompacting while normal sintering requires precompacting. The precompacting may be effected with or without compacting aids.

In one embodiment of the second aspect, the aforesaid formulation is formed into the desired shape by the ordinary forming (or compacting) processes such as the press-forming process using conventional compacting aids such as organic binders. Thereafter, the thus formed mass is subjected to primary sintering into a relative theoretical density of 95-99% in an inert gas so as to prevent the oxidation of $TiC_x$. The primary sintering usually includes a preliminary step of removal of the forming aids. The primary sintering is carried out in such a manner that the crytical relative density versus the theoretical density ("relative theoretical density") of at least 95% is achieved in any of sintering manners, e.g., the normal sintering or HP process. The normal sintering is ones such that sintering is conducted without applying mechanical pressure to the mass to be sintered.

The primary sintering is usually carried out at a temperature of 1600°-1800° C., preferably 1650°-1750° C. for about 30-180 min. where normal sintering is selected.

When the relative theoretical density after the primary sintering is less than 95%, no sufficient densification is achieved in the subsequent HIP treatment. When it is larger than 99%, on the other hand, the grain growth of $Al_2O_3$ takes place. In either case, the strength of the sintered mass drops.

The HIP treatment is carried out under normally applied conditions such as at a temperature of 1400° to 1580° C. and under a pressure of no less than 200 kPa (preferably 1000 to 2000 kPa). A relative theoretical density after the HIP treatment should reach at least 99.5% so as to attain a practical strength.

According to the present invention, the resultant sintered mass has a similar "x" number for TiCx with the starting formulation, i.e., the resultant x is within plus/minus about 0.02 (absolute). If organic binder is used, x tends to increase due to the residual carbon from the organic binder, while x tends to decrease if no organic binder is used.

The ceramic tools obtained according to the first and second aspects as mentioned above excel in wear resistance and toughness. The reasons are that the bonding strength of $Al_2O_3$ and TiCx is high, and the crystal grains of $Al_2O_3$ is minute. Hence, the ceramics produced by the presently invented process are useful as the cutting tools for cast iron, copper, high nickel, aluminium, titanium, etc., or nonmetals, or as mechanical parts on which violent vibration or high heat acts.

EXAMPLE 1

One example according to the first aspect of the present invention will be given.

Alpha—$Al_2O_3$ having a purity of 99.9 wt % and a mean particle size of 0.7 microns (μm), TiCx prepared as shown in Table 1, and sintering aids were formulated together as specified in Table 2. The formulations were wet-mixed together for 40 hours in a ball mill. Thereafter, drying gave mixed powders. The mixed powders were sintered at the temperatures as specified in Table 2, and a pressure of 200 kgf/cm² for 15 minutes in a graphite mold by the hot-pressing process. The obtained sintered masses were cut into 13×13×15 mm, and were finished to the tip shape of SNGN 432 (JIS) with the use of a diamond grinding wheel. The chamfer of 0.1 mm×25° was provided. With the resultant tips, cutting tests were effected under the following conditions I and II. The results are set forth in Table 2.

CUTTING TEST CONDITIONS

I Material to be cut: FC20 (HB190-220)
Cutting Conditions:
  Cutting Speed (V)=800 m/min,
  Depth of Cut (t)=0.5 mm,
  Rate of Feed (f)=0.25 mm/rev.
Estimation of Life:
  Measurement of the flank wear width $V_B$(mm) after the outer periphery of 120 mm diameter×15 mm length had been cut 100 times.
II Material to be cut: SKD11 (HRC 62)
Cutting Conditions:
  Cutting Speed (V)=150 m/min,
  Depth of cut (t)=0.5 mm,
  Rate of Feed (f)=0.17 mm/rev.
Estimation of Life: Measurement of the flank wear width $V_B$ (mm) of the tested tips after a rod member of 120 mm diameter had been cut for 15 minutes.

TABLE 1

| Raw Materials | x of TiCx | Total C (wt %) | Free C (wt %) | $O_2$ (wt %) | Particle Size (μm) |
| --- | --- | --- | --- | --- | --- |
| TiC 0.97 | 0.97 | 19.64 | 0.15 | 0.82 | 1.52 |
| Tic 0.90 | 0.90 | 18.54 | 0.14 | 0.86 | 1.45 |
| TiC 0.82 | 0.82 | 17.13 | 0.09 | 0.92 | 1.49 |
| TiC 0.76 | 0.76 | 16.03 | 0.10 | 1.10 | 1.60 |
| TiC 0.68 | 0.68 | 14.56 | 0.03 | 2.52 | 1.51 |
| TiC 0.58 | 0.58 | 12.74 | 0.05 | 3.81 | 1.42 |

TABLE 2-1

| Sample No. | TiCx Raw Materials | wt % | $Al_2O_3$ wt % | Sintering Aid Raw Materials | wt % | Raw Materials | wt % | Sintering Temp. (°C.) |
| --- | --- | --- | --- | --- | --- | --- | --- | --- |
| Examples | | | | | | | | |
| 1 | TiC 0.82 | 25 | 74 | MgO | 1 | | | 1800 |
| 2 | TiC 0.76 | 35 | 64 | MgO | 1 | | | 1800 |
| 3 | TiC 0.68 | 23 | 76 | MgO | 1 | | | 1750 |
| 4 | TiC 0.82 | 40 | 59 | MgO | 1 | | | 1850 |
| 5 | TiC 0.90 | 45 | 54 | MgO | 1 | | | 1850 |
| 6 | TiC 0.82 | 30 | 69 | MgO | 1 | | | 1800 |
| 7 | TiC 0.68 | 28 | 71 | MgO | 0.5 | CaO | 0.5 | 1750 |
| 8 | TiC 0.90 | 47 | 51.5 | MgO | 1 | $ZrO_2$ | 0.5 | 1850 |
| 9 | TiC 0.76 | 35 | 63.5 | MgO | 0.5 | $Y_2O_3$ | 1 | 1800 |
| 10 | TiC 0.82 | 25 | 73.5 | CaO | 0.5 | NiO | 1 | 1800 |
| 11 | TiC 0.68 | 22 | 76.5 | MgO | 1 | $SiO_2$ | 0.5 | 1750 |
| 12 | TiC 0.76 | 32 | 67.5 | MgO | 0.5 | | | 1800 |
| 13 | TiC 0.90 | 28 | 71 | CaO | 1 | | | 1800 |
| 14 | TiC 0.76 | 37 | 62 | $Y_2O_3$ | 1 | | | 1850 |
| 15 | TiC 0.82 | 30 | 69.5 | $Dy_2O_3$ | 0.5 | | | 1800 |
| 16 | TiC 0.90 | 25 | 74 | $Tb_4O_7$ | 1 | | | 1800 |
| Comparative Examples | | | | | | | | |
| 17 | TiC 0.76 | 55 | 44 | MgO | 1 | | | 1800 |
| 18 | TiC 0.90 | 15 | 84 | MgO | 1 | | | 1750 |
| 19 | TiC 0.97 | 22 | 77.5 | MgO | 0.5 | | | 1800 |
| 20 | TiC 0.58 | 20 | 79 | CaO | 1 | | | 1750 |
| 21 | TiC 0.82 | 35 | 64.95 | MgO | 0.05 | | | 1900 |
| 22 | TiC 0.90 | 25 | 72.5 | MgO | 2.5 | | | 1700 |
| Commercially Available $Al_2O_3$—TiC Base Ceramics | | | | | | | | |

TABLE 2-2

| Sample No. | Hardness* | Relative Theoretical Density (%) | Cutting Test I $V_B$ (mm) | Cutting Test II $V_B$ (mm) |
| --- | --- | --- | --- | --- |
| Examples | | | | |
| 1 | 91.3 | 99.5 | 0.17 | 0.14 |

TABLE 2-2-continued

| Sample No. | Hardness* | Relative Theoretical Density (%) | Cutting Test I $V_B$ (mm) | Cutting Test II $V_B$ (mm) |
| --- | --- | --- | --- | --- |
| 2 | 91.2 | 99.8 | 0.14 | 0.14 |
| 3 | 90.5 | 99.7 | 0.16 | 0.16 |
| 4 | 91.1 | 99.6 | 0.16 | 0.13 |
| 5 | 91.3 | 99.8 | 0.18 | 0.13 |
| 6 | 91.5 | 99.6 | 0.15 | 0.12 |
| 7 | 90.6 | 99.6 | 0.15 | 0.16 |
| 8 | 90.8 | 99.7 | 0.19 | 0.16 |
| 9 | 91.0 | 99.8 | 0.15 | 0.15 |
| 10 | 91.0 | 99.7 | 0.17 | 0.14 |
| 11 | 90.3 | 99.5 | 0.17 | 0.16 |
| 12 | 91.6 | 99.7 | 0.16 | 0.12 |
| 13 | 91.4 | 99.8 | 0.18 | 0.14 |
| 14 | 90.9 | 99.7 | 0.16 | 0.15 |
| 15 | 91.3 | 99.5 | 0.15 | 0.15 |
| 16 | 90.8 | 99.6 | 0.16 | 0.16 |
| Comparative Examples | | | | |
| 17 | 90.7 | 99.4 | 0.32 | Chipped in 10 sec. |
| 18 | 90.3 | 99.5 | 0.28 | Chipped in 1 min. |
| 19 | 90.5 | 99.6 | 0.25 | Chipped in 1 min. |
| 20 | 90.0 | 99.7 | 0.30 | Chipped in 40 sec. |
| 21 | 88.1 | 98.2 | 0.35 | Chipped in 10 sec. |
| 22 | 89.1 | 99.6 | 0.33 | Chipped in 1 min. |
|  | 89.5 | 99.7 | 0.24 | Chipped in 8 min. |

*Rockwell 45N Scale

The results given in Table 2 have indicated that, in the following cases (1)-(6), the ceramic tools increase in the wear and, in some cases, fracture.

(1) Where the content of TiCx is more than 50% by weight, as is the case with No. 17.
(2) Where the content of TiCx is less than 20% by weight, as is the case with No. 18.
(3) Where the value of $\times$ in TiCx exceeds 0.93, as is the case with No. 19.
(4) Where the value of $\times$ in TiCx is smaller than 0.65, as is the case with No. 20.
(5) Where the amount of the sintering aid is less than 0.1% by weight, as is the case with No. 21.
(6) Where the amount of the sintering aid is larger than 2% by weight, as is the case with No. 22.

From what is given above, it has been noted that it is absolutely required that the value of $\times$ in TiCx and the amounts of TiCx and sintering aid be on the given order.

EXAMPLE 2

One example according to the second aspect of the present invention will be given.

Alpha—$Al_2O_3$ having a purity of 99.9 wt % and a mean particle size of 0.7 microns, TiCx prepared as specified in Table 1, rare earth oxides and optionally sintering aids were formulated together, as specified in Table 3, and were wet-mixed together for 40 hours in a ball mill. Thereafter, drying gave mixed powders. Four (4) % by weight of paraffine were added to the mixed powders, and the resulting products were pressed in a mold at a pressure of 1.0 ton/$cm^2$ into a post-sintering size of 13×13×5 mm. The thus obtained masses were subjected to the primary sintering into a relative theoretical density of 95-99% in an inert gas atmosphere and at the temperatures as specified in Table 3 (at normal temperature). After the primary sintering, sintering was carried out at 1450° C. and a pressure of 1500 kgf/$cm^2$ for 1 hour in a HIP furnace. The inert gas used was an argon gas. The obtained sintered products were finished into the tip shape of SNGN 432 (JIS) with the use of a diamond grinding wheel. The chamfer was then 0.1 mm×25°. With these tips, cutting tests were carried out. The results are set forth in Table 3.

CUTTING TEST CONDITIONS

I Material to be cut: FC20 (HB200-220)
Cutting Conditions:
  Cutting Speed (V)=900 m/min,
  Depth of Cut (t)=0.5 mm,
  Rate of Feed (f)=0.25 mm/rev.
Estimation of Life: Measurement of the flank wear width $V_B$ of the tested tips after the outer periphery of 120 mm diameter×15 mm length had been cut 100 times.

II Material to be cut: SKD11 (HRC 60)
Cutting Conditions:
  Cutting Speed (V)=120 m/min,
  Depth of Cut (t)=0.5 mm,
  Rate of Feed (f)=0.1 mm/rev.
Estimation of Life: Measurement of the flank wear width $V_B$ after a rod member of 120 mm diameter had been cut for 20 minutes.

The results of Table 3 have indicated that, in the following cases (1)-(8), the ceramics increase in the wear and, in some cases, fracture.

(1) Where the content of TiCx is more than 50% by weight, as is the case with No. 19.
(2) Where the content of TiCx is less than 20% by weight, as is the case with No. 20.
(3) Where the value of x in TiCx exceeds 0.93, as is the case with No. 21.
(4) Where the value of x in TiCx is smaller than 0.65, as is the case with No. 22.
(5) Where the amount of one or more rare earth oxides is smaller than 0.05% by weight, as is the case with No. 23.
(6) Where the amount of one or more rare earth oxides is larger than 3% by weight, as is the case with No. 24.
(7) Where the relative theoretical density after the primary sintering is less than 95%, as is the case with No. 25.
(8) Where the relative theoretical density after the primary sintering exceeds 99%, as is the case with No. 26.

TABLE 3-1

| Sample No. | TiCx Raw Materials | TiCx wt % | $Al_2O_3$ wt % | Rare Earth Oxide Raw Materials | Rare Earth Oxide wt % | Sintering Aid Raw Materials | Sintering Aid wt % | Primary Sintering Temp. (°C.) |
| --- | --- | --- | --- | --- | --- | --- | --- | --- |
| Examples | | | | | | | | |
| 1 | TiC 0.82 | 29 | 69.5 | $Ho_2O_3$ | 1 | CaO | 0.5 | 1660 |
| 2 | TiC 0.76 | 37 | 61 | $Er_2O_3$ | 1 | MgO | 1 | 1660 |
| 3 | TiC 0.90 | 23 | 75.5 | $Y_2O_3$ | 1 | $ZrO_2$ | 0.5 | 1640 |
| 4 | TiC 0.76 | 40 | 58 | $Y_2O_3$ | 0.5 | MgO | 1.5 | 1700 |
| 5 | TiC 0.68 | 44 | 55 | $Dy_2O_3$ | 0.5 | CaO | 0.5 | 1700 |
| 6 | TiC 0.90 | 28 | 70.1 | $Tb_4O_7$ | 0.1 | MgO | 1.8 | 1660 |

TABLE 3-1-continued

| Sample No. | TiCx Raw Materials | wt % | Al₂O₃ wt % | Rare Earth Oxide Raw Materials | wt % | Sintering Aid Raw Materials | wt % | Primary Sintering Temp. (°C.) |
|---|---|---|---|---|---|---|---|---|
| 7 | TiC 0.82 | 23 | 75.5 | Dy₂O₃ | 0.8 | MgO | 0.7 | 1640 |
| 8 | TiC 0.68 | 29 | 68.2 | Er₂O₃ | 2.7 | SiO₂ | 0.1 | 1640 |
| 9 | TiC 0.82 | 25 | 73.5 | Y₂O₃ | 0.5 | MgO | 1 | 1660 |
| 10 | TiC 0.76 | 35 | 63.5 | Dy₂O₃ | 1 | MgO | 0.5 | 1680 |
| 11 | TiC 0.76 | 28 | 70.2 | Gd₂O₃ | 0.8 | NiO | 1 | 1660 |
| 12 | TiC 0.82 | 33 | 65.3 | Y₂O₃ | 1.2 | CaO | 0.5 | 1680 |
| 13 | TiC 0.90 | 23 | 75.2 | Tb₄O₇ | 1 | CaO | 0.8 | 1640 |
| 14 | TiC 0.76 | 30 | 68.5 | Dy₂O₃ | 0.5 | MgO | 1 | 1680 |
| 15 | TiC 0.68 | 20 | 78 | Ho₂O₃ | 1.5 | ZrO₂ | 0.5 | 1640 |
| 16 | TiC 0.82 | 30 | 69 | Dy₂O₃ | 1 | | | 1660 |
| 17 | TiC 0.76 | 25 | 73.5 | Y₂O₃ | 1.5 | | | 1680 |
| 18 | TiC 0.82 | 20 | 79 | Tb₄O₇ | 1 | | | 1640 |
| Comparative Examples | | | | | | | | |
| 19 | TiC 0.90 | 51 | 45 | Gd₂O₃ | 2 | CaO | 2 | 1740 |
| 20 | TiC 0.68 | 14 | 85 | Tb₄O₇ | 0.5 | Zr₂O | 0.5 | 1620 |
| 21 | TiC 0.97 | 23 | 75 | Dy₂O₃ | 0.5 | MgO | 1.5 | 1660 |
| 22 | TiC 0.58 | 33 | 65 | Y₂O₃ | 1 | NiO | 1 | 1680 |
| 23 | TiC 0.82 | 25 | 73.98 | Y₂O₃ | 0.02 | MgO | 1 | 1850 |
| 24 | TiC 0.90 | 20 | 74.5 | Tb₄O₇ | 3.5 | Zr₂O | 2 | 1620 |
| 25 | TiC 0.76 | 35 | 63 | Er₂O₃ | 1 | CaO | 1 | 1600 |
| 26 | TiC 0.68 | 31 | 66 | Y₂O₃ | 1.5 | MgO | 1.5 | 1740 |
| Commercially Available Al₂O₃—TiC Base Ceramics | | | | | | | | |

TABLE 3-2

| Sample No. | Relative Theoretical Density After Primary Sintering (%) | Hardness After HIP* | Relative Theoretical Density (%) | Cutting Test I V_B (mm) | II V_B (mm) |
|---|---|---|---|---|---|
| Examples | | | | | |
| 1 | 97.2 | 91.0 | 99.6 | 0.13 | 0.14 |
| 2 | 97.8 | 91.5 | 99.8 | 0.14 | 0.15 |
| 3 | 96.8 | 90.9 | 99.7 | 0.11 | 0.13 |
| 4 | 96.5 | 90.7 | 99.7 | 0.12 | 0.15 |
| 5 | 96.6 | 90.5 | 99.5 | 0.15 | 0.16 |
| 6 | 97.2 | 90.8 | 99.8 | 0.14 | 0.17 |
| 7 | 97.5 | 91.2 | 99.7 | 0.12 | 0.14 |
| 8 | 98.3 | 90.4 | 99.6 | 0.14 | 0.17 |
| 9 | 97.2 | 91.3 | 99.6 | 0.12 | 0.15 |
| 10 | 97.4 | 91.4 | 99.7 | 0.11 | 0.13 |
| 11 | 96.9 | 91.4 | 99.6 | 0.12 | 0.14 |
| 12 | 97.0 | 91.2 | 99.7 | 0.13 | 0.14 |
| 13 | 98.0 | 91.0 | 99.8 | 0.13 | 0.15 |
| 14 | 97.7 | 91.5 | 99.5 | 0.11 | 0.13 |
| 15 | 98.2 | 90.7 | 99.6 | 0.14 | 0.16 |
| 16 | 97.1 | 90.8 | 99.6 | 0.13 | 0.15 |
| 17 | 96.6 | 91.0 | 99.6 | 0.12 | 0.14 |
| 18 | 97.3 | 90.7 | 99.7 | 0.14 | 0.16 |
| Comparative Examples | | | | | |
| 19 | 96.5 | 89.7 | 99.6 | 0.24 | Chipped in 4 min. |
| 20 | 96.2 | 89.5 | 99.7 | 0.20 | Chipped in 1 min. |
| 21 | 97.3 | 90.2 | 99.7 | 0.24 | Chipped in 5 min. |
| 22 | 97.1 | 90.0 | 99.5 | 0.22 | Chipped in 10 min. |
| 23 | 96.3 | 84.3 | 99.7 | 0.52 | Chipped in 10 sec. |
| 24 | 96.9 | 88.7 | 99.8 | 0.32 | Chipped in 10 sec. |
| 25 | 93.3 | 89.1 | 94.2 | 0.35 | Chipped in 10 sec. |
| 26 | 99.3 | 89.2 | 99.8 | 0.30 | 0.28 |
| Commercially Available Al₂O₃—TiC Base Ceramics | | 89.5 | 99.7 | 0.23 | 0.23 |

*Rockwell 45N Scale

What is claimed is:

1. A highly tough ceramic hot press-sintered product produced by the process consisting essentially of the steps of:
    providing a formulation consisting essentially of 20 to 50% by weight of titanium carbide expressed in terms of the general formula TiCx wherein x is 0.65 to 0.93, 0.1 to 2% by weight of one or more sintering aids, and 48–79.9% by weight of Al₂O₃, and sintering said formulation by the hot press-sintering process.

2. The product as defined in claim 1, wherein the relative theoretical density of the resultant sintered mass is brought to at least 99% by the hot press-sintering process.

3. The product as defined in claim 1, wherein said formulation is press-sintered with or without precompacting said formulation.

4. The product as defined in claim 1, wherein said one or more sintering aids are selected from the group consisting of MgO, CaO, $SiO_2$, $ZrO_2$, NiO, $Th_2O_3$, AlN, TiO, $TiO_2$, $Cr_2O_3$ or rare earth oxide.

5. The product as defined in claim 4, wherein said rare earth oxide is at least one selected from the group consisting of $Y_2O_3$, $Dy_2O_3$, $Er_2O_3$, $Ho_2O_3$, $Gd_2O_3$ and $Tb_4O_7$.

6. The product as defined in claim 1, wherein x is not greater than 0.9.

7. The product as defined in claim 1, wherein x is not greater than 0.82.

8. The product as defined in claim 1, which does not chip and has a flank wear width of not more than 0.16 mm when tested under cutting conditions of:
   cutting speed being 150 mm/min;
   depth of cut being 0.5 mm;
   rate of feed being 0.17 mm/rev; and
   the flank wear width $V_B$ being measured after a rod member of SKD 11 having a Rockwell hardness HRC 62 has been cut for 15 minutes.

9. A highly tough ceramic hot pressed sintered product produced by the process consisting essentially of the steps of:
   providing a formulation consisting essentially of 20 to 50% by weight of titanium carbide expressed in terms of the general formula $TiC_x$ wherein x is 0.65 to 0.93, 0.05 to 3.0% by weight of one or more rare earth oxides, and 47 to 79.95% by weight of $Al_2O_3$,
   subjecting said formulation to primary sintering in an inert gas until relative theoretical density of 95-99% is achieved, and
   sintering the resultant mass by the hot isostatic pressing process.

10. The product as defined in claim 9, wherein the relative theoretical density of the resultant product is brought to at least 99.5% by the hot isostatic pressing process.

11. The product as defined in claim 9, wherein said one or more rare earth oxides are selected from $Dy_2O_3$, $Y_2O_3$, $Tb_4O_7$, $Ho_2O_3$, $Er_2O_3$ and $Gd_2O_3$.

12. The product as defined in claim 9, wherein said primary sintering is effected with or without precompacting.

13. The product as defined in claim 9, wherein said formulation further includes no more than 2% by weight of one or more sintering aids selected from the group consisting of MgO, CaO, $SiO_2$, $ZrO_2$, NiO, $Th_2O_3$, AlN, TiO, $TiO_2$, and $Cr_2O_3$.

14. The product as defined in claim 9, wherein x is not greater than 0.9.

15. The product as defined in claim 9, wherein x is not greater than 0.82.

16. The product as defined in claim 9, which does not chip and has a flank wear width of not more than 0.16 mm when tested under cutting conditions of:
   cutting speed being 150 mm/min;
   depth of cut being 0.5 mm;
   rate of feed being 0.17 mm/rev; and
   the flank wear width $V_B$ being measured after a rod member of SKD 11 having a Rockwell hardness HRC 62 has been cut for 15 minutes.

* * * * *